US006426455B2

(12) United States Patent
Hasegawa

(10) Patent No.: US 6,426,455 B2
(45) Date of Patent: Jul. 30, 2002

(54) SYSTEM AND METHOD FOR TEACHING/LEARNING TO PLAY A MUSICAL INSTRUMENT

(75) Inventor: Yutaka Hasegawa, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/892,380

(22) Filed: Jun. 26, 2001

(30) Foreign Application Priority Data

Jul. 6, 2000 (JP) ....................................... 2000-204901

(51) Int. Cl.[7] ................................................ G09B 15/00
(52) U.S. Cl. ...................................................... 84/470 R
(58) Field of Search ............................... 84/645, 470 R, 84/477 R, 478, 479 R, 479 A

(56) References Cited

U.S. PATENT DOCUMENTS 5,464,946 A * 11/1995 Lewis .................. 84/477 R X
6,069,310 A * 5/2000 James ......................... 84/645
6,072,113 A * 6/2000 Tohgi et al. .............. 84/470 R
6,211,451 B1 * 4/2001 Tohgi et al. .............. 84/470 R

* cited by examiner

*Primary Examiner*—Stanley J. Witkowski
(74) *Attorney, Agent, or Firm*—Morrison & Foerster LLP

(57) ABSTRACT

The fee for practicing to play a musical instrument is charged on a user so that the user may practice to play the musical instrument with eagerness when the user practices to play the musical instrument using a terminal device that can be connected to a server. A terminal device 10 can be connected to a server 30 via a network NW. A keyboard instrument 26 is connected to terminal device 10, and the user practices to play the musical instrument with the use of keyboard instrument 26. Practice information representing a state of the user's practicing to play the musical instrument is transmitted to server 30 to be stored within server 30. Server 30 determines the fee for the user's playing practice and the fee for materials used for practicing to play by discounting the fees in accordance with the practice information, and charges the determined fees on the user. The practice information contains information directly or indirectly representing the frequency of practicing, level rising rate, number of times courses are finished, and total hours of practice, whereby a lower fee is charged on a user that practices to play the musical instrument with more eagerness.

24 Claims, 6 Drawing Sheets

SYSTEM AND METHOD FOR TEACHING/LEARNING TO PLAY A MUSICAL INSTRUMENT

FIELD OF THE INVENTION

The present invention relates to a system and a method for teaching/learning to play a musical instrument wherein the system has a terminal device and a server that are communicable with each other so that the musical instrument may be connected to the terminal device and the server side may guide a user when the user practices to play the musical instrument, as well as to the server applied thereto.

DESCRIPTION OF THE BACKGROUND ART

Hitherto, for example, as disclosed in Japanese Patent Laid-open Application No. 10-187022/1998, a system is known in which a program for practicing to play a musical instrument is installed in a personal computer and a keyboard instrument is connected to the computer so as to allow the user to practice playing the keyboard instrument in accordance with the program.

However, in the aforesaid conventional apparatus, it is not easy for the user to obtain various teaching materials although the user can practice playing the musical instrument by selecting various teaching materials for practice. Moreover, regarding the programs for the playing practice, it is difficult to prepare a program that can adopt a method of practice most suitable for each teaching material, and also there is a possibility that the program becomes huge. Due to this limitation on the programs, it may not be possible to provide an appropriate guidance on the user.

SUMMARY OF THE INVENTION

In order to deal with the aforesaid problems of the prior art, the inventors of the present invention thought of letting the user practice playing the musical instrument with the use of a terminal device (computer device) communicably connected to a server via a network such as the internet, a public telephone line, an exclusive-use line, or a LAN (local area network). According to this system, the user can easily obtain a product related to the playing practice including a teaching material for the playing practice, and an appropriate guidance can be provided to the user.

The present invention aims at appropriately charging a fee on the user with respect to the practice of playing a musical instrument in a system or method for practicing the musical instrument such as described above. In particular, the present invention provides a method of charging a fee so that the user may practice playing the musical instrument with eagerness.

In order to achieve the aforesaid object, the first characteristic feature of the present invention lies in a system or method for teaching/learning to play a musical instrument, the system having a terminal device and a server that are communicable with each other so that the musical instrument may be connected to the terminal device and the server side may guide a user when the user practices to play the musical instrument, wherein the terminal device transmits practice information, which represents a state of the user's practicing to play the musical instrument, to the server, and the server determines a fee for the user's practicing to play the musical instrument by discounting the fee in accordance with the practice information, and charges the determined fee on the user.

Further, the second characteristic feature of the present invention lies in that the server determines the fee of a product related to the user's practicing to play the musical instrument, which product is purchased by the user from the server with the use of the terminal device, by discounting the fee in accordance with the practice information, and charges the determined fee on the user.

In these system or method, the server may calculates a frequency of practicing on the basis of the practice information to discount the fee in accordance with the frequency of practicing. Further, the server may calculates a rising rate of the evaluation scores on the basis of the practice information to discount the fee in accordance with the rising rate of the evaluation scores. Furthermore, the server may calculates number of times courses are finished on the basis of the practice information to discount the fee in accordance with the number of times courses are finished. Furthermore, the server further may calculates total hours of practice on the basis of the practice information to discount the fee in accordance with the total hours of practice.

According to another aspect of the present invention, there is provided a server applied to the system or method for teaching/learning to play a musical instrument, as well as a method of teaching/learning a musical instrument suitable for the server.

In the invention as described above, the fee for the playing practice or the fee of the product related to the playing practice is automatically charged on the user that practices to play a musical instrument. The charged fee is discounted in accordance with the practice information representing a state of the user's practicing to play the musical instrument. According to this system or method, the user's state of practicing to play the musical instrument can be reflected on the discount rate, for example, when the user frequently practices playing, when the user practices playing for a long period of time, when the user learns the course of practice with certainty as a result of the playing practice, or when the user's level of playing improves. As a result, the user will practice playing the musical instrument with eagerness, and the speed of learning to play the musical instrument will be higher.

DESCRIPTION OF THE PREFERRED EMBODIMENTS

Figure 1:
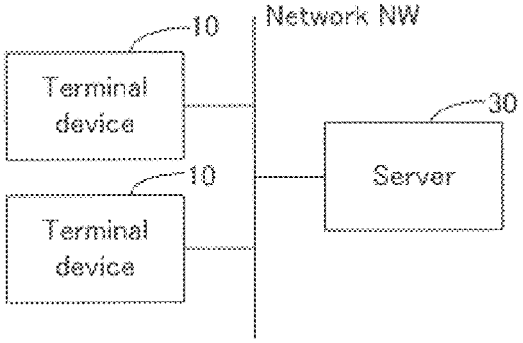
FIG. 1 is a block diagram illustrating a system for teaching/learning to play a musical instrument according to one embodiment of the present invention.

Hereafter, one embodiment of the present invention will be described with reference to the attached drawings. FIG. 1 is a block diagram illustrating a system for teaching/learning to play a musical instrument (system for practicing to play a musical instrument) according to this embodiment.

This system for teaching/learning to play a musical instrument is constituted with a plurality of terminal devices 10 and one or more servers 30 that are connected with each other via a network (communication line) NW such as the internet, a public telephone line, an exclusive-use line, or a LAN.

Figure 2:
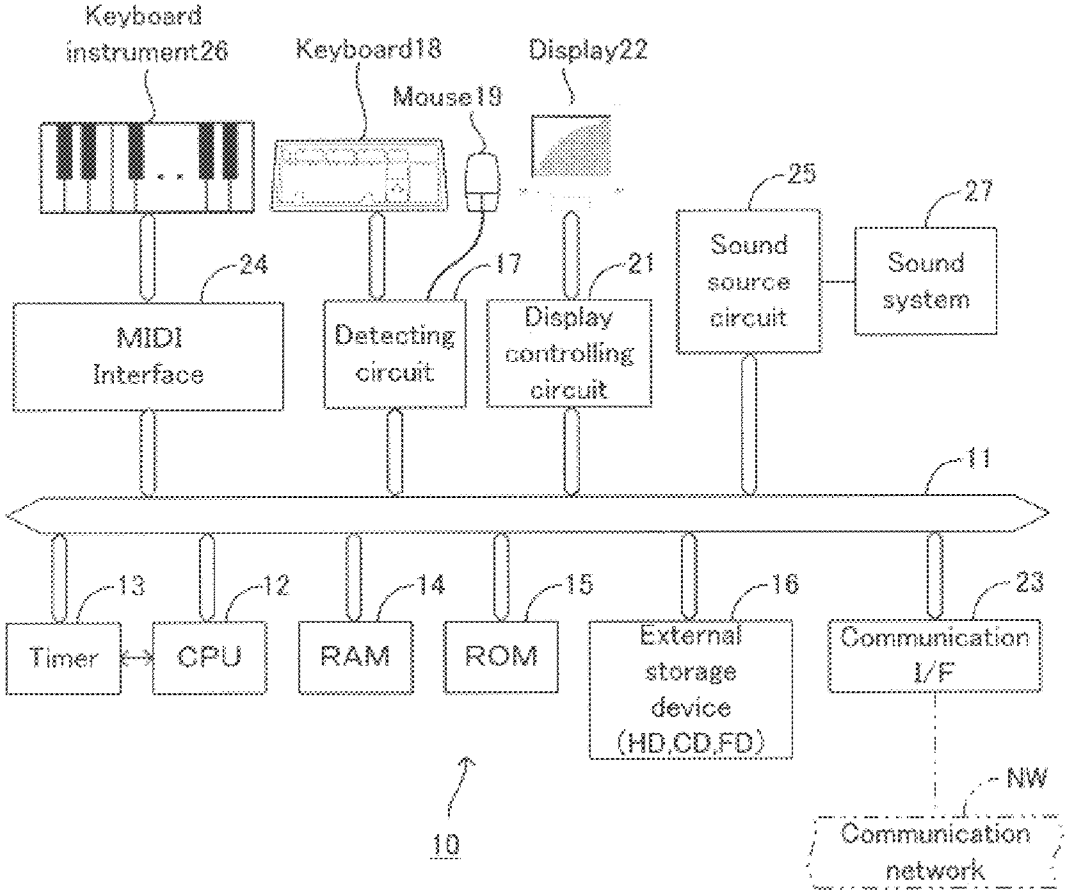
FIG. 2 is a block diagram of a terminal device in FIG. 1.

Terminal device 10 is used for the user to practice playing a musical instrument, and is mainly made of a computer device. Referring to FIG. 2, this terminal device 10 includes a CPU 12, a timer 13, a RAM 14, a ROM 15, and an external storage device 16 that are connected to a bus 11 to constitute a computer body.

CPU 12 executes a program to control communication between terminal device 10 and server 30 via network NW, and aids the user's practicing to play the musical instrument. Timer 13 is instructed by CPU 12 or the like to count the time needed in execution of the program, and supplies the time information to CPU 12. Timer 13 also incorporates a clock circuit that keeps the current date and time. RAM 14 temporarily stores the variables that are input or calculated by the execution of the program, and stores a part of the program that is stored beforehand by external storage device 16 and transferred from storage device 16 at the time of execution. ROM 15 stores constants needed for the execution of the program, as well as a part of the program.

External storage device 16 is constituted with a driving device, a hard disk HD incorporated in advance in the driving device, a compact disk CD and a flexible disk FD selectively incorporated in the driving device, and others. These hard disk HD, compact disk CD, flexible disk FD, and others store constants needed for the execution of the program as well as a part of or whole of the program, and also stores the variables that are input or calculated by the execution of the program.

Further, bus 11 is connected to an input device such as a keyboard 18 and a mouse 19 via a detecting circuit 17, and to a display 22 or the like via a display controlling circuit 21. Also, the bus 11 is connected to a communication interface 23.

The input device such as keyboard 18 and mouse 19 is operated so as to input the user's instruction into the computer body. Detecting circuit 17 detects the operation of the input device such as keyboard 12 and mouse 19, and outputs the detected operation information to CPU 12. Display controlling circuit 21 controls the displaying of display 22 under control of CPU 12. Display 22 displays the contents of the user's playing practice, the contents of the instruction to the user, the contents of communication with server 30, and others by the aforesaid control. Communication interface 23 is configured to enable communication with server 30 via communication network NW.

Further, terminal device 10 includes a MIDI interface 24 and a sound source circuit 25 that are connected to bus 11. A keyboard instrument 26 is connectable to MIDI interface 24 so that the information on the playing of keyboard instrument 26 may be supplied to CPU 12. Here, in this embodiment, keyboard instrument 26 is adopted as a musical instrument to be used for practicing to play; however, one can make use of various musical instruments connectable to MIDI interface 24 as well. Sound source circuit 25 inputs the playing information supplied from CPU 12 to form and output musical sound signals in accordance with the playing information. Sound circuit 25 is connected to sound system 27 made of an amplifier, a speaker, and others.

Figure 3:
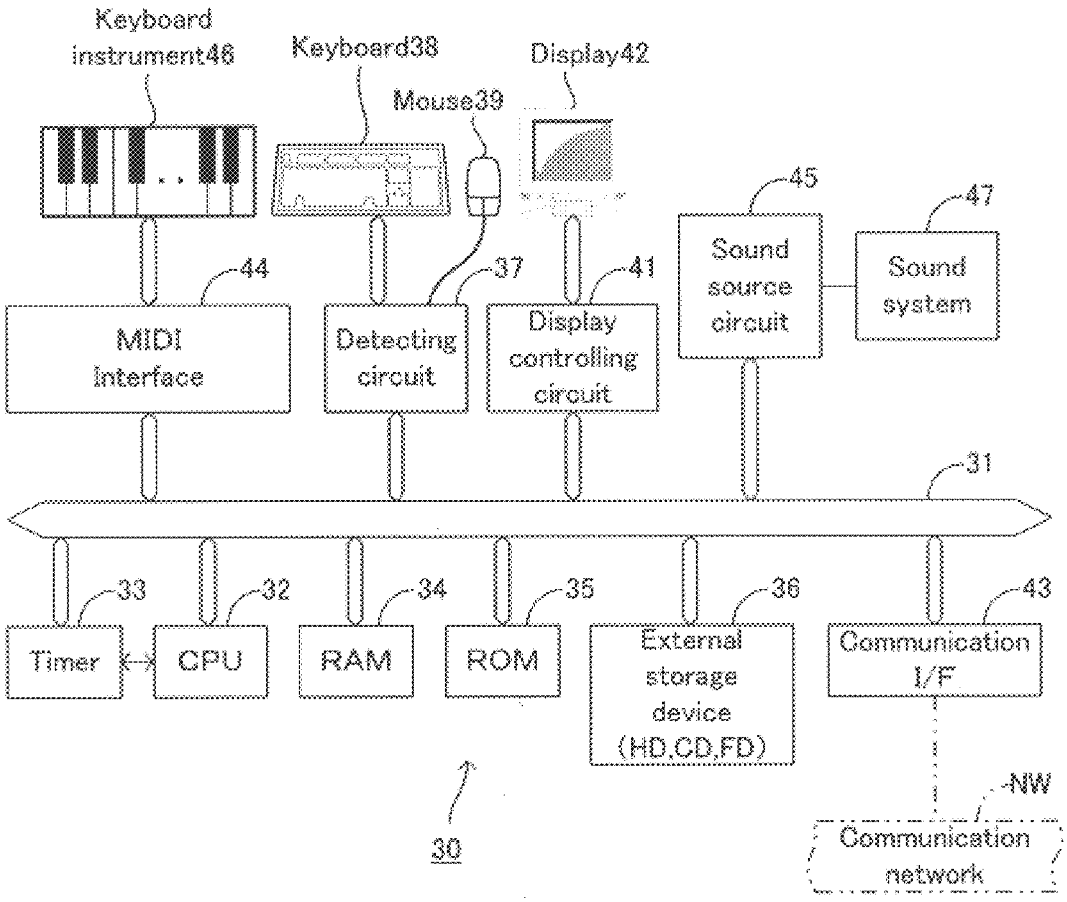
FIG. 3 is a block diagram of a server in FIG. 1.

Referring to FIG. 3, server 30 also is constituted with a bus 31, a CPU 32, a timer 33, a RAM 34, a ROM 35, an external storage device 36, a detecting circuit 37, a keyboard 38, a mouse 39, a display controlling circuit 41, a display 42, a communication interface 43, a MIDI interface 44, a sound source circuit 45, etc., and is constructed substantially in the same manner as terminal device 10. A keyboard instrument 46 and a sound system 47 are connectable to MIDI interface 44 and sound source circuit 45, respectively. However, in this server 30, ROM 35 and external storage device 36 store a server program and server data specific to server 30. Particularly, external storage device 36 is made to have a large capacity, and stores playing-practice programs used by the user for practicing to play a musical instrument, various subprograms operating on the playing-practice programs, and various teaching materials (products) as well for supplying to the user.

Hereafter, the operation of the embodiment constructed as shown above will be described. When the user wishes to practice playing a musical instrument using this playing-practice system, the user accesses server 30 to download from server 30 a playing-practice program for constructing the system. In this case, the downloaded program is stored in a hard disk or the like provided in external storage device 16. This downloading maybe carried out either free of charge or by charging a fee. Alternatively, a compact disk CD or the like containing the aforesaid playing-practice program may be delivered from the server side to the user in accordance with the user's request. In this case, the user installs the playing-practice program recorded in the compact disk CD into hard disk HD or the like.

Figure 4:
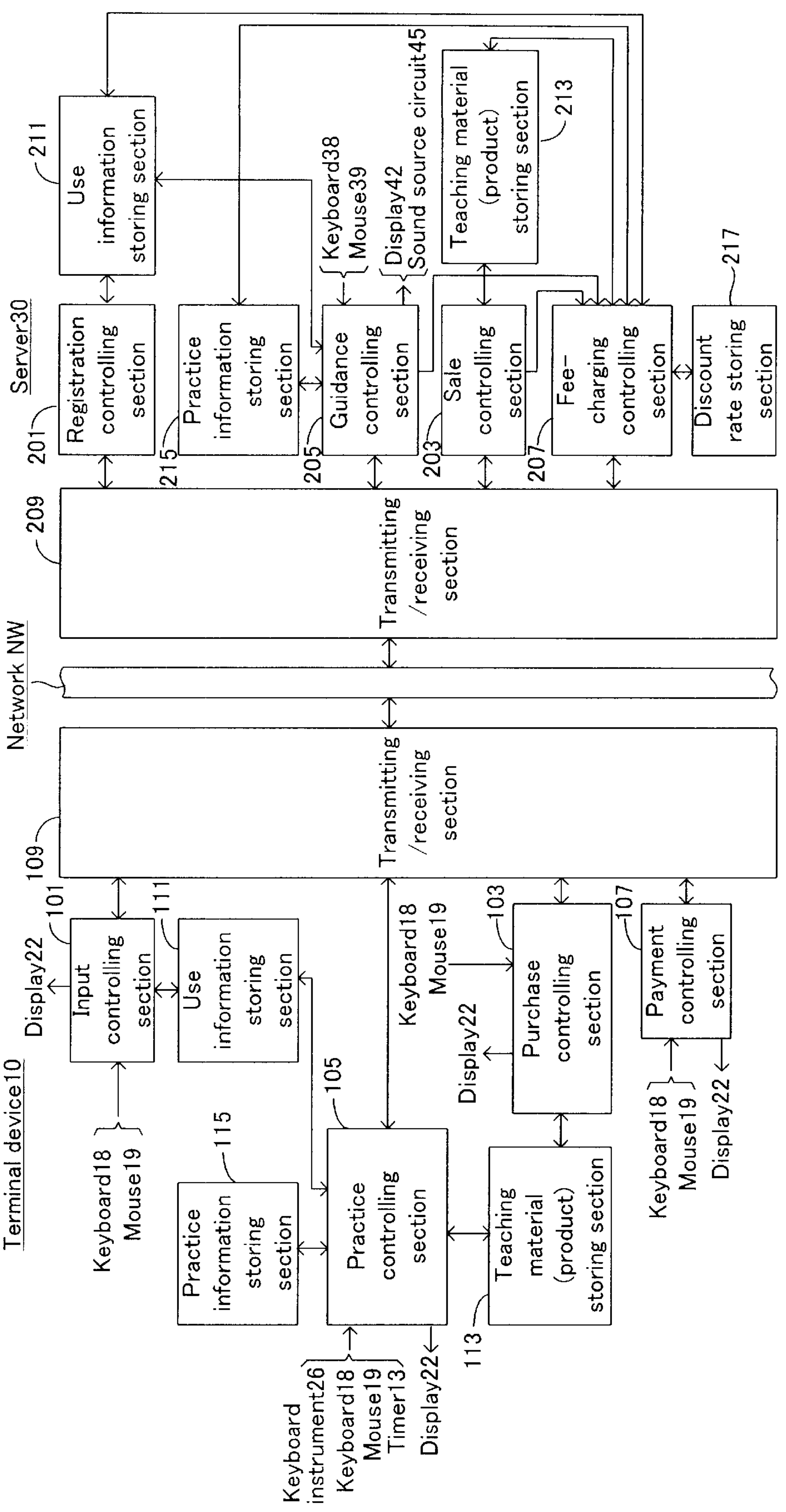
FIG. 4 is a functional block diagram of the aforesaid system for teaching/learning to play a musical instrument.

In practicing to play the musical instrument, the user starts the aforesaid playing-practice program with the use of keyboard 18 and mouse 19 of terminal device 10. Functions attained by the playing-practice programs in terminal device 10 include an inputting function, a purchasing function, a practicing function, a paying function, and a transmitting/receiving function. FIG. 4 is a functional block diagram illustrating the system for teaching/learning to play a musical instrument according to this embodiment, where terminal device 10 includes an input controlling section 101, a purchase controlling section 103, a practice controlling section 105, a payment controlling section 107, and a transmitting/receiving section 109 for attaining the aforesaid various functions. However, input controlling section 101, purchase controlling section 103, practice controlling section 105, and payment controlling section 107 actually correspond to a part of the aforesaid playing-practice program, RAM 14 used at the time of executing the program, and others. Transmitting/receiving section 109 actually corresponds to a part of the aforesaid playing-practice program, communication interface 23, and others.

Server 30 includes a registration controlling section 201, a sale controlling section 203, a guidance controlling section 205, a fee-charging controlling section 207, and a transmitting/receiving section 209 in order to attain a registering function, a selling function, a guiding function, a fee-charging function, and a transmitting/receiving function, respectively. However, in this case also, registration controlling section 201, sale controlling section 203, guidance controlling section 205, and fee-charging controlling section 207 actually correspond to a part of a server program corresponding to the aforesaid playing-practice program, RAM 34 used at the time of executing the program, and others. Transmitting/receiving section 209 actually corresponds to a part of the aforesaid server program, communication interface 43, and others.

Hereafter, the overall operation of the system for teaching/learning to play a musical instrument will be described in detail with reference to the above-mentioned functional block diagram shown in FIG. 4. When the user begins the playing practice using the playing-practice program for the first time, the user must carry out user registration in server 30. In this case, input controlling section 101 displays on display 22 a request for input of information on the user. The user inputs information specifying the user, information on the user, information representing the user's practicing environment, and others with the use of keyboard 18 or mouse 19. The information specifying the user includes, for example, the user's name and domicile address, the address of terminal device 10 used by the user, and others. The information on the user includes, for example, the user's age, sex, needs, experience of playing musical instruments, and others. The information representing the user's practicing environment includes, for example, apparatus owned by the user including the musical instruments owned by the user.

After the aforesaid information is input, input controlling section 101 displays on display 22 a request for input of the wish of registration for final confirmation of the user's wish of registration. When the user inputs the wish of registration with the use of keyboard 18 and mouse 19 of terminal device 10, input controlling section 101 transmits the aforesaid input information and wish of registration to server 30 via transmitting/receiving section 109 and network NW.

Figure 5:
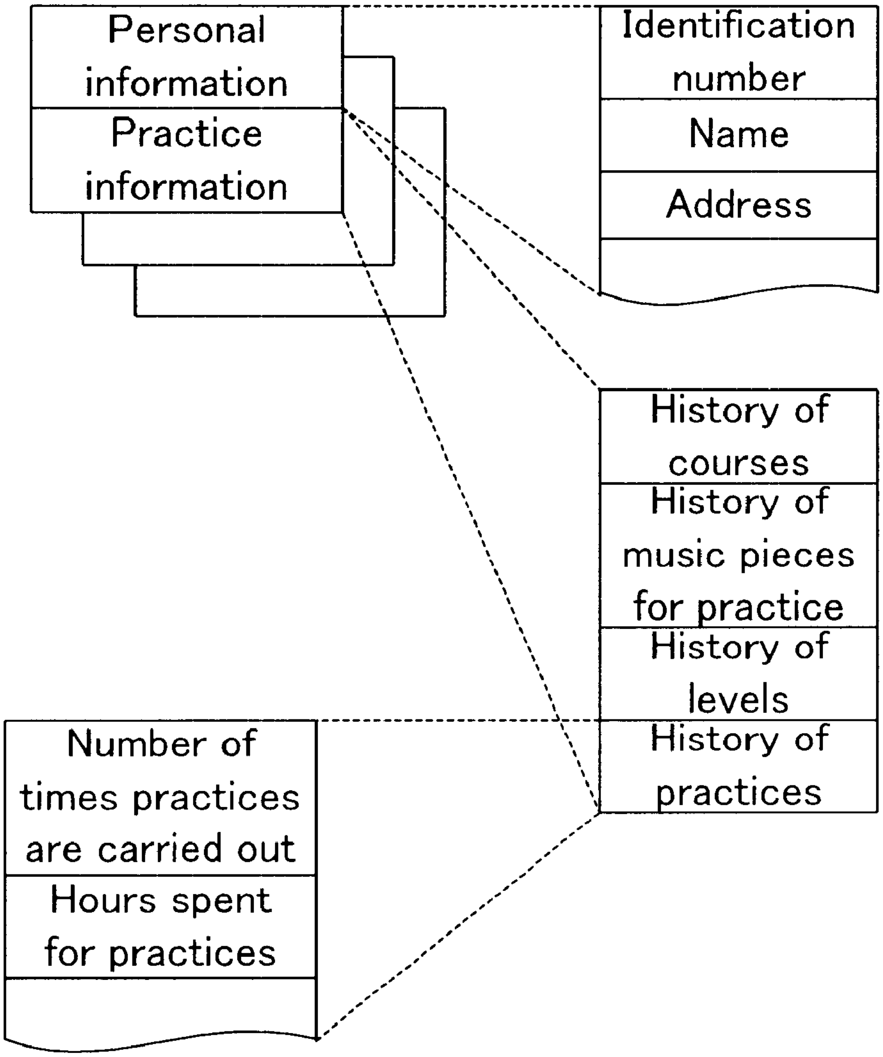
FIG. 5 is a view of a data format for personal and practice information stored in a use information storing section in FIG. 4.

In response to this, registration controlling section 201 in server 30 determines an identification number of the user and stores the identification number as well as the information supplied from terminal device 10 into use information storing section 211 as personal information (See FIG. 5). Further, referring to FIG. 5, a storage area is provided in use information storing section 211 for storing practice information in correspondence with the personal information. Here, the use information storing section 211 corresponds to a part of external storing device 36 such as a hard disk HD. After the personal information is stored in the use information storing section 211, registration controlling section 201 transmits the aforesaid determined identification number to terminal device 10 via transmitting/receiving section 209 and network NW. Here, as described above, communication between terminal device 10 and server 30 is in principle carried out via transmitting/receiving sections 109, 209 and network NW, so that it is assumed hereafter that the aforesaid communication is carried out unless particularly indicated otherwise.

In terminal device 10, this identification number is stored into use information storing section 111 as personal information (See FIG. 5) together with the aforesaid input information. Further, referring to FIG. 5, a storage area is provided in use information storing section 111 for storing practice information in correspondence with the aforesaid personal information. Here, the use information storing section 111 corresponds to a part of external storage device 16 such as a hard disk HD.

Next, the user purchases a product needed for the playing practice. In this case, purchase controlling section 103 informs server 30 of the teaching material (product) that the user wishes to purchase, in accordance with the user's instruction using keyboard 18 and mouse 19. In server 30, sale controlling section 203 presents the teaching materials stored in the teaching material (product) storing section 213 together with the fees for the teaching materials to terminal device 10. The presented teaching materials and fees are displayed on display 22. Here, the teaching materials herein referred to are, for example, subprograms started on the playing-practice program to be used for the playing practice, MIDI data of the music for practice that is used for the playing practice, music score data for printing, and others.

When the user gives an instruction for the purchase of a desired teaching material with the use of keyboard 18 and mouse 19 after the aforementioned teaching materials are presented, purchase controlling section 103 informs server 30 of the instruction. Here, in specifying a teaching material, the user makes a search among the teaching materials stored in teaching material storing section 213. On the other hand, in server 30, sale controlling section 203 and fee-charging controlling section 207 read out the teaching material indicated by the user and the fee for the teaching material from teaching material storing section 213, and transmit them to terminal device 10. In terminal device 10, purchase controlling section 103 stores the transmitted teaching material into teaching material storing section 113. Here, this teaching material storing section 113 corresponds to a part of external storage device 16 such as a hard disk HD, and stores numerous teaching materials together with the index for searching and the fees.

Alternatively, the teaching material may be provided from server 30 side to the user by means of postal mail, home delivery service, or the like instead of transmission via network NW. In other words, subprograms, various data, and others constituting a part of the teaching material as described above may be recorded in a compact disk CD or the like and the music scores constituting a part of the teaching material may be printed on a sheet so that the compact disk CD, the printed music scores, and others may be delivered to the user.

For the purchase of these various teaching materials, the aforesaid determined identification number is used. Also, the charging and the payment of the fees for the teaching material are processed by fee-charging controlling section 207 in server 30 and payment controlling section 107 in terminal device 10. This process will be described in detail later.

Here, the teaching materials used for the playing practice will be explained together with the method for teaching/learning to play the musical instrument. When the user wishes to practice one piece of music, the user purchases a teaching material to be used for the practice of playing that piece of music by the aforesaid purchasing process. As described above, the teaching material includes, for example, subprograms started on the playing-practice program to be used for the playing practice, the MIDI data (musical performance date including tone pitches, tone lengths, etc.) of the music for practice that is used for the playing practice, music score data for printing, and the like. Among these, the MIDI data may be prepared in advance for each of a plurality of courses corresponding to a plurality of stages or levels, or may be separated into a plurality of courses by the aforesaid subprograms. The courses may correspond respectively to a plurality of parts (for example, melody parts, accompaniment parts, or the like), or may be a combination of a plurality of parts. The user completes the practice of playing one piece of music by successively learning these plural parts.

The plurality of courses are prepared to correspond to the user's playing levels, such as an advanced level, an intermediate level, and an elementary level. At the time of the purchase of the teaching material, server 30 may propose a type of the teaching materials for purchase on the basis of the later-mentioned practice information by using terminal device 10. The user determines the teaching material to be purchased by taking the user's own playing level, wishes, and others into account. Here, the plurality of courses separated into different levels provide different arrangements with different degrees of difficulty in playing, even though the courses are directed to the same part of the same music piece. Further, depending on the music, there may be cases in which the teaching materials for elementary-level users or intermediate-level users are not prepared, or conversely, there may be cases in which the teaching materials for advanced-level users or intermediate-level users are not prepared.

Each of the aforesaid plurality of courses are learned through accumulation of a plurality of partial practices, where one part may be partitioned into plural portions with the lapse of time, or may be partitioned into plural portions of contents such as the practice in fingering or the practice in rhythm (timing). Further, the subprograms constituting the teaching material may perform the partition into plural portions. Therefore, the user learns one course of practice upon successively completing the learning of a plurality of partial practices. As described before, the user learns to play one piece of music upon successively completing the learning of plural courses. The present invention is not limited to such successive learning of practices to play one piece of music but can be applied to various teaching/learning processes of playing as long as it is directed to successive learning of lessons for practice made of a plurality of courses.

Next, an explanation will be given on the case in which the user practices to play a musical instrument using the aforesaid purchased teaching material. Practice controlling section 105 displays the tasks for practice on display 22, and allows the user to practice playing a keyboard instrument 26. As described above, the playing practice is successively carried out for each course on the basis of the purchased teaching material stored in teaching material storing section 113, and partial practices are carried out in each course. Specifically, by making a reference to the practice information (FIG. 5) stored in the later-mentioned use information storing section 111 in correspondence with the aforesaid personal information, a task for the practice of this time is presented to the user on the basis of information such as the history of courses, history of music pieces for practice, and the like up to the previous time. For this presentation, practice controlling section 105 may display a portion of the music score as a task for the practice of this time on display 22, or may display a key-pressing indication mark corresponding to the music score on a figure of the keyboard instrument. Further, practice controlling section 105 successively supplies the data representing the tone pitches in the MIDI data related to the task for practice to sound source circuit 25, in accordance with the passage of time defined by the data representing the tone lengths in the MIDI data, whereby sound source circuit 25 reproduces sound signals corresponding to the data representing the tone pitches.

The user carries out the playing practice using keyboard instrument 26 upon seeing the instruction on display 22 and/or listening the sound reproduced by sound source circuit 25. The information on playing that accompanies the playing practice is supplied to sound source circuit 25, whereby sound source circuit 25 forms music sound signals on the basis of the information on playing. The music sound signals are input into sound system 27 which in turn generates music sounds corresponding to the sound signals. Here, the playing practice is not limited to the practice of playing a keyboard instrument 26, but may be applied to the practice of wind instruments, stringed instruments, and others as long as the information on playing can be input into the computer via MIDI interface 24 or another interface.

The information on playing at the time of playing practice is temporarily stored into practice information storing section 115. Here, practice information storing section 115 corresponds to a part of RAM 14 and/or external storage device 16 such as hard disk HD. In the storage of the practice information, data representing the time of starting the playing practice, the time of ending the playing practice, the selected contents of practice, and others are also stored in addition to the information on playing such as the keys (tone pitches) depressed on the keyboard instrument 26, intervals (tone lengths) of depressing the keys, and the key touches. The information related to time is formed on the basis of the count by timer 13. Further, the playing practice can be interrupted in the midway, and in that case, information on the time of interruption, the time of restart, and the site of interruption is also stored in practice information storing section 115. Further, if the user has repeatedly practiced the same contents for a number of times, the previous information on playing that is stored in practice information storing section 115 may be renewed with new information on playing.

When such playing practice is finished, practice controlling section 105 transmits the practice information stored in practice information storing section 115 to server 30 by the user's instruction using keyboard 18 and mouse 19. Further, the practice information may be transmitted when the playing practice is interrupted, or the practice information may be transmitted to server 30 periodically under the control of timer 13. In server 30, the transmitted practice information is stored into practice information storing section 215 under the control of guidance controlling section 205. Practice information storing section 215 corresponds to a part of RAM 34 and/or external storage device 36 such as hard disk HD.

In the meantime, guidance controlling section 205 evaluates the user's playing practice on the basis of the practice information stored in practice information storing section 215. In this case, guidance controlling section 205 may automatically evaluate the user's playing practice only by execution of the program, or the evaluation may be carried out by an instructing person. If the evaluation is carried out only by execution of the program, the contents stored in teaching material storage section 213 as designated by the data included in the aforesaid practice information and representing the selected contents of practice are compared with the information on playing (tone pitches, tone lengths, key touches) included in the practice information. The user's playing practice is evaluated by determining the degree of coincidence of only the tone pitches, the degree of coincidence of only the tone lengths, the degree of coincidence of the tone pitches and tone lengths, and the like. If the evaluation is carried out by an instructing person, the information on playing included in the practice information may be converted into music scores to be displayed on display 42, or the information on playing may be supplied to sound source circuit 45 to reproduce music sounds. The instructing person evaluates the user's playing practice on the basis of the music score displayed on display 42 or the sounds reproduced by sound source circuit 45. The results of evaluation are input into guidance controlling section 205 by means of keyboard 38 and mouse 39.

Evaluation information representing the results of evaluation made by this program or the instructing person is additionally stored into practice information storing section 215 as a part of the aforesaid practice information. Further, the aforesaid evaluation information contains comments on the playing practice in addition to the evaluation score of the playing practice of this time, and also, if the evaluation score is good (if the score is above or equal to a predetermined score), the evaluation information further contains the data representing the end of practice of each part, each course, and each music piece corresponding to the playing practice of this time. Then, guidance controlling section 205 additionally stores the practice information of this time into the practice information storing area prepared in use information storing section 211 in correspondence with the aforesaid personal information, on the basis of the practice information stored in practice information storing section 215.

Referring to FIG. 5, the practice information storing area is divided into a course history area, a practice music piece history area, a level history area, and a practice history area. In the additional storage of the practice information, the data representing the end of practice of each course and each music piece constituting a part of the evaluation information is additionally stored as the course history information and the practice music piece history information together with the date and time of the end of practice in the course history area and in the practice music piece history area in addition to the data contained in the practice information received from terminal device 10 and representing the contents of practice. The evaluation score of the practice of this time is additionally stored into the level history area together with the date and time of the end of practice.

The number of practicing times stored in the practice history area is incremented by "1". However, this number of practicing times is the number of practicing times for each predetermined period, and the incremented number of practicing times is stored together with the data representing the period every time a predetermined period of time (for example, one week) passes. In the next predetermined period, the number of practicing times is counted up newly from "0", and the counted value as well as the period of time that has passed from the start of counting up are stored. Further, the hours of practice calculated by guidance controlling section 205 on the basis of the time of starting the playing practice, the time of ending the playing practice, the time of interrupting the playing practice, and the time of restarting the playing practice received from terminal device 10 are additionally stored together with the date and time of practice. Thus, every time the user performs the playing practice, the practice information stored in use information storing section 211 is supplemented or renewed.

Further, guidance controlling section 205 transmits to terminal device 10 the comments on the playing practice of this time and the practice information newly and additionally stored into use information storing section 211 with respect to the playing practice of this time. In terminal device 10, practice controlling section 105 receives the transmitted comments and practice information, and informs the user of the evaluation on the playing practice by displaying on display 22 the evaluation information contained in the practice information together with the comments. Practice controlling section 105 renews the practice information stored in the practice information storing section 115 on the basis of the received practice information in the same manner as in server 30. Here, the practice information storing area in the practice information storing section 115 is also divided into a plurality of storage areas in the same manner as in server 30. The course history information, the practice music piece information, and the practicing hours are additionally stored into the practice information storing area, and the number of practicing times stored in the practice information storing area is renewed.

Next, the fee-charging control carried out by server 30 will be described. This fee-charging control is carried out at the time of ending the aforesaid playing practice by the user (at the time immediately after the practice information including the evaluation information is transmitted to terminal device 10) and at the time of purchasing the teaching material (product) (at the time immediately after the instruction to purchase the teaching material is transmitted from terminal device 10). In other words, fee-charging controlling section 207 charges a fee on the user when guidance controlling section 205 finishes the guidance on the use's playing practice and when sale controlling section 203 sells the teaching material to the user.

Figure 6:
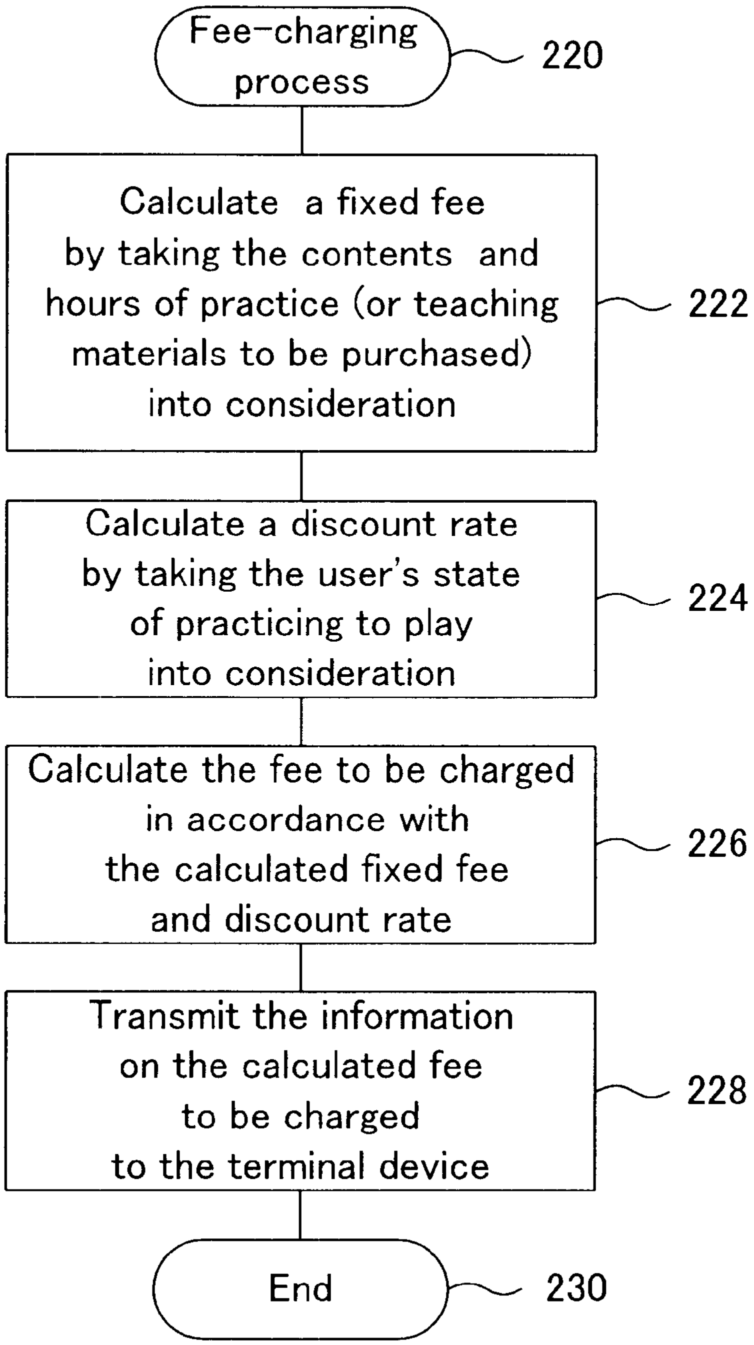
FIG. 6 is a flowchart of a program executed by a CPU in FIG. 3 and representing a function of a fee-charging controlling section on the server side in FIG. 4.
Figure 7A:
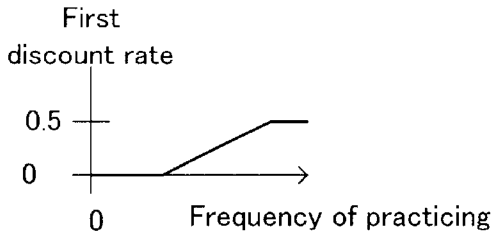
FIGS. 7(A) to 7(D) are graphs showing characteristics of various tables for determining discount rates in charging a fee.
Figure 7B:
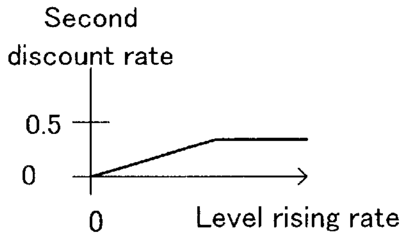
Figure 7C:
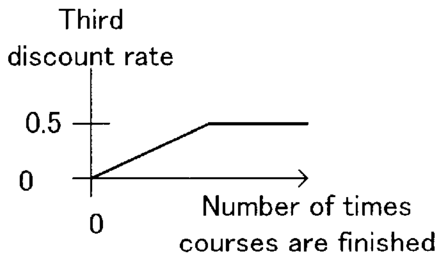
Figure 7D:
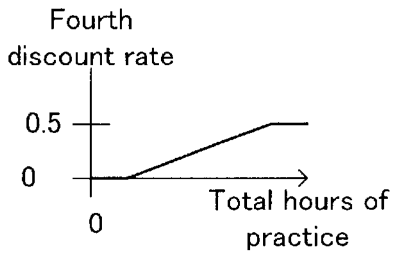

First, the fee-charging process carried out on the user's playing practice will be described. Fee-charging controlling section 207 starts execution of the fee-charging process routine shown in FIG. 6 at step 220 in response to the end of guidance on the playing practice. After the execution of the fee-charging process routine is started, fee-charging controlling section 207 determines a fixed fee for the user's playing practice on the basis of the data representing the contents of practice and the data representing the hours of practice in the practice information stored in practice information storing section 215 and use information storing section 211 at step 222. This fixed fee is calculated by multiplying the hours of practice to the basic fee per unit period of time that is determined in advance in accordance with the contents of practice.

Next, fee-charging controlling section 207 calculates a discount rate by making reference to a table of frequency of practicing, a table of level rising rate, a table of the number of times courses are finished, and a table of total hours of practice, which are provided in discount rate storing section 217, using the data representing the state of the user's playing practice in the practice information stored in use information storing section 211 at step 224. These various tables store first to fourth discount rates (all are smaller than "1") that respectively increase according as the frequency of practice, the level rising rate, the number of times courses are finished, and the total hours of practice increase, as shown in FIGS. 7(A) to 7(D) Here, this discount rate storing section 217 corresponds to a part of external storage device 36 such as hard disk HD.

A specific method of calculating the discount rates will be described. First, regarding the first discount rate, the numbers of practicing times for a predetermined period of time (for example, about several weeks) going back from the present to the past in the numbers of times stored in use information storing section 211 are read out and, with regard to the newest number of practicing times, the data representing the period of time that has passed after the start of the new counting-up is also read out. Next, the read-out numbers of practicing times are summed up, and the total period of time needed for the summed numbers of practicing times is also calculated, and the summed numbers of times are divided by the total period of time to obtain a frequency of practicing. Then, the discount rate corresponding to the calculated frequency of practicing is read out from the table of frequency of practicing to give the first discount rate.

With regard to the second discount rate, the evaluation scores for a predetermined number of times (for example, about several times) going back from the present to the past stored in use information storing section 211 are read out, and the rising rate of the evaluation scores from the past to the present is calculated. For the calculation of the rising rate, among the evaluation scores that are read out, a sum of the differences of each pair of evaluation scores directed from the past to the present may be calculated, or a sum of the rising rates of each pair may be calculated. Then, the discount rate corresponding to the calculated sum is read out from the table of level rising rate to give the second discount rate.

With regard to the third discount rate, all the course history information stored in use information storing section 211 is read out to calculate the number of times courses are finished. In this case also, the course history information for a predetermined period of time (for example, one month) going back from the present to the past stored in use information storing section 211 may be read out to calculate the number of times courses are finished for the predetermined period of time. Then, the discount rate corresponding to the calculated number of times courses are finished is read out from the table of the number of times courses are finished to give the third discount rate.

With regard to the fourth discount rate, all the hours of practice stored in use information storing section 211 is read out, and the hours of practice are summed up to calculate the total hours of practice. Then, the discount rate corresponding to the calculated total hours of practice is read out from the table of total hours of practice to give the fourth discount rate.

After the calculation of the first to fourth discount rates, an average value of the first to fourth discount rates is calculated to give a final discount rate. Here, by setting the aforesaid discount rates of each table to be predetermined small values, the sum of the first to fourth discount rates may be determined as a final discount rate instead of the average value of the first to fourth discount rates. In this embodiment, the aforesaid first to fourth discount rates are adopted as the discount rates corresponding to the state of use of the present system for teaching/learning to play the musical instrument, i.e. the state of the user's playing practice. However, one may make use of only a part of these first to fourth discount rates in calculating the final discount rate. Further, one may determine the discount rate by using other indices if they represent the state of the user's playing practice.

After the calculation of the discount rate, fee-charging controlling section 207 calculates the fee to be charged in step 226 by reducing the fixed fee calculated in the process of step 222 with the use of the discount rate calculated in the process of step 224. In step 228, fee-charging controlling section 207 transmits to terminal device 10 the information representing the calculated fee to be charged, and ends the execution of this fee-charging process routine in step 230.

In terminal device 10, payment controlling section 107 inputs the information representing the charged fee, and displays the information on display 22 to prompt the user to pay the charged fee. The display on display 22 includes the designation of a method of payment in addition to the charged fee. When the user carries out an operation to pay the charged fee including the method of payment with the use of keyboard 18 and mouse 19, payment controlling section 107 ends the payment procedure including the notification to server 30. Here, a method such as a credit card, bank transfer, or postal transfer can be adopted as the method of payment to be carried out by the user.

Next, the fee-charging process at the time of the user's purchase of a teaching material (product) will be described. When an instruction to purchase a teaching material is transmitted from terminal device 10 to server 30 during the aforementioned process of purchasing the teaching material (product) by the purchase controlling section 103, fee-charging controlling section 207 starts the execution of the aforementioned fee-charging process routine shown in FIG. 6. In this case, fee-charging controlling section 207 reads out the fee related to the teaching material that the user wishes to purchase from teaching material information storing section 213, and determines the fee as a fixed fee. After this process of step 222, fee-charging controlling section 207 executes the processes of steps 224 to 228 similar to the above so as to determine a discount rate corresponding to the state of the user's playing practice, and to charge the fee on terminal device 10 by reducing the fixed fee in accordance with the determined discount rate.

In terminal device 10 also, when the user performs a payment operation similar to the above, the payment process is finished as well. Here, in this case, it is not until the payment process is finished that the above-described process of purchasing the teaching material by purchase controlling section 103 is finished.

According to the above embodiment, the fee for the playing practice or the fee of the teaching material for the playing practice is determined by being discounted to a greater extent according as the frequency of practicing, the level rising rate, the number of times courses are finished, and the total hours of practice calculated on the basis of the practice information stored in use information storing section 211 increase. In other words, the discount rate will be higher, for example, when the user frequently practices playing, when the user practices playing for a long period of time, when the user learns the course of practice with certainty as a result of the playing practice, or when the user's level of playing improves as a result of the playing practice. Since this discounted fee is charged on the user that practices to play the musical instrument, a lower fee will be charged on a user that practices to play a musical instrument with more eagerness. As a result, the user will practice playing the musical instrument with eagerness, and the speed of learning to play the musical instrument will be higher.

Here, in the above embodiment, teaching materials such as programs, information on playing (MIDI data), and musical scores directly used for the playing practice are shown as examples of the product sold from the server side to the user side (terminal device 10 side). However, products widely related to the playing practice, such as information on the composer of the practice music piece used for the playing practice, musical performance date (MIDI data) related to other music pieces of the same composer, and musical scores related to other music pieces of the same composer, can be dealt with as products to be sold, even though they may not be directly used for the playing practice. In this case also, one can sell the products related to the playing practice by discounting the fees of the products in accordance with the user's state of playing practice such as the frequency of practicing, the level rising rate, the number of times courses are finished, and the total hours of practice. Here, the information on the products related to the playing practice other than the products directly used for the playing practice may be stored in teaching material storing section 213 of server 30, or may not be stored.

The above embodiment is one example of the present invent ion and it will be understood that various modification may be made without departing from the object and the spirit of the present invention.

What is claimed is:

1. A system for teaching/learning to play a musical instrument, said system having a terminal device and a server that are communicable with each other so that said musical instrument may be connected to said terminal device and said server side may guide a user when the user practices to play said musical instrument, wherein said terminal device comprises practice information transmitter for transmitting practice information, which represents a state of the user's practicing to play the musical instrument, to said server, and said server comprises fee-charging controller for determining a fee for the user's practicing to play the musical instrument by discounting the fee in accordance with said practice information, and for charging the determined fee on the user.

2. A system for teaching/learning to play a musical instrument, said system having a terminal device and a server that are communicable with each other so that said musical instrument may be connected to said terminal device and said server side may guide a user when the user practices to play said musical instrument, wherein said terminal device comprises:

purchase controller for the user to purchase a product related to the user's practicing to play the musical instrument from said server side; and practice information transmitter for transmitting practice information, which represents a state of the user's practicing to play the musical instrument, to said server, and said server comprises fee-charging controller for determining a fee for said product by discounting the fee in accordance with said practice information, and for charging the determined fee on the user.

3. A method for teaching/learning to play a musical instrument, said method being applied to a system having a terminal device and a server that are communicable with each other so that said musical instrument may be connected to said terminal device and said server side may guide a user when the user practices to play said musical instrument, wherein said terminal device transmits practice information, which represents a state of the user's practicing to play the musical instrument, to said server, and said server determines a fee for the user's practicing to play the musical instrument by discounting the fee in accordance with said practice information, and charges the determined fee on the user.

4. A method for teaching/learning to play a musical instrument, said method being applied to a system having a terminal device and a server that are communicable with each other so that said musical instrument may be connected to said terminal device and said server side may guide a user when the user practices to play said musical instrument, wherein said terminal device is made capable of indicating to the server the user's wish to purchase a product related to the user's practicing to play the musical instrument from said server side, and transmits practice information, which represents a state of the user's practicing to play the musical instrument, to said server, and said server determines a fee for said product by discounting the fee in accordance with said practice information, and charges the determined fee on the user.

5. A server that is communicable with a terminal device and applied to teaching/learning of playing a musical instrument for guiding a user when the user practices to play said musical instrument connected to said terminal device, said server comprising:

fee determination means for determining a fee for the user's practicing to play the musical instrument by discounting the fee in accordance with practice information transmitted from said terminal device and representing a state of the user's practicing to play the musical instrument; and charge means for charging said determined fee on the user.

6. A server according to claim 5, wherein said fee determination means calculates a frequency of practicing on the basis of said practice information to discount said fee in accordance with the frequency of practicing.

7. A server according to claim 5, wherein said fee determination means calculates a rising rate of evaluation scores on the basis of said practice information to discount said fee in accordance with the rising rate of the evaluation scores.

8. A server according to claim 5, wherein said fee determination means calculates number of times courses are finished on the basis of said practice information to discount said fee in accordance with the number of times courses are finished.

9. A server according to claim 5, wherein said fee determination means calculates total hours of practice on the basis of said practice information to discount said fee in accordance with the total hours of practice.

10. A server that is communicable with a terminal device and applied to teaching/learning of playing a musical instrument for guiding a user when the user practices to play said musical instrument connected to said terminal device, said server comprising:

fee determination means for determining a fee for a product to be purchased by the user and related to the user's practicing to play the musical instrument by discounting the fee in accordance with practice information transmitted from said terminal device and representing a state of the user's practicing to play the musical instrument; and charge means for charging said determined fee on the user.

11. A server according to claim 10, wherein said fee determination means calculates a frequency of practicing on the basis of said practice information to discount said fee in accordance with the frequency of practicing.

12. A server according to claim 10, wherein said fee determination means calculates a rising rate of evaluation scores on the basis of said practice information to discount said fee in accordance with the rising rate of the evaluation scores.

13. A server according to claim 10, wherein said fee determination means calculates number of times courses are finished on the basis of said practice information to discount said fee in accordance with the number of times courses are finished.

14. A server according to claim 10, wherein said fee determination means calculates total hours of practice on the basis of said practice information to discount said fee in accordance with the total hours of practice.

15. A method for teaching/learning to play a musical instrument, said method being applied to a server that is communicable with a terminal device for guiding a user when the user practices to play said musical instrument connected to said terminal device, said method comprising the steps of:

determining a fee for the user's practicing to play the musical instrument by discounting the fee in accordance with practice information transmitted from said terminal device and representing a state of the user's practicing to play the musical instrument; and charging the determined fee on the user.

16. A method for teaching/learning to play a musical instrument according to claim 15, wherein the step of determining comprises:

calculating a frequency of practicing on the basis of said practice information; and discounting said fee in accordance with the frequency of practicing.

17. A method for teaching/learning to play a musical instrument according to claim 15, wherein the step of determining comprises:

calculating a rising rate of evaluation scores on the basis of said practice information; and discounting said fee in accordance with the rising rate of the evaluation scores.

18. A method for teaching/learning to play a musical instrument according to claim 15, wherein the step of determining comprises:

calculating number of times courses are finished on the basis of said practice information; and discounting said fee in accordance with the number of times courses are finished.

19. A method for teaching/learning to play a musical instrument according to claim 15, wherein the step of determining comprises:

calculating total hours of practice on the basis of said practice information; and discounting said fee in accordance with the total hours of practice.

20. A method for teaching/learning to play a musical instrument, said method being applied to a server that is communicable with a terminal device for guiding a user when the user practices to play said musical instrument connected to said terminal device, said method comprising the steps of:

determining a fee for a product to be purchased by the user and related to the user's practicing to play the musical instrument by discounting the fee in accordance with practice information transmitted from said terminal device and representing a state of the user's practicing to play the musical instrument; and charging the determined fee on the user.

21. A method for teaching/learning to play a musical instrument according to claim 20, wherein the step of determining comprises:

calculating a frequency of practicing on the basis of said practice information; and discounting said fee in accordance with the frequency of practicing.

22. A method for teaching/learning to play a musical instrument according to claim 20, wherein the step of determining comprises:

calculating a rising rate of evaluation scores on the basis of said practice information; and discounting said fee in accordance with the rising rate of the evaluation scores.

23. A method for teaching/learning to play a musical instrument according to claim 20, wherein the step of determining comprises:

calculating number of times courses are finished on the basis of said practice information; and discounting said fee in accordance with the number of times courses are finished.

24. A method for teaching/learning to play a musical instrument according to claim 20, wherein the step of determining comprises:

calculating total hours of practice on the basis of said practice information; and discounting said fee in accordance with the total hours of practice.

* * * * *